United States Patent

Kerner et al.

[11] Patent Number: 5,950,416
[45] Date of Patent: Sep. 14, 1999

[54] ENDLESS TENTERING CHAIN AND INNER CHAIN LINK FOR SUCH A TENTERING CHAIN

[75] Inventors: Horst Kerner, Lindenberg; Hans-Juergen Maierhofer, Lindau; Werner Bosch, Pfronten-Ried, all of Germany

[73] Assignee: Lindauer Dornier Gesellschaft mbH, Lindau, Germany

[21] Appl. No.: 09/019,651

[22] Filed: Feb. 6, 1998

[30] Foreign Application Priority Data

Feb. 8, 1997 [DE] Germany .......................... 197 04 827

[51] Int. Cl.$^6$ .................................................. F16G 13/06
[52] U.S. Cl. .......................... 59/78; 59/4; 59/5; 474/206; 474/209
[58] Field of Search .................................. 59/4, 5, 8, 78; 474/209, 206

[56] References Cited

U.S. PATENT DOCUMENTS

| | | | |
|---|---|---|---|
| 4,355,502 | 10/1982 | Sheldon | 59/4 |
| 4,926,529 | 5/1990 | Hosmer et al. | 59/5 |
| 5,140,806 | 8/1992 | Rohloff | 59/4 |
| 5,465,568 | 11/1995 | Wang | 59/4 |

FOREIGN PATENT DOCUMENTS

| | | |
|---|---|---|
| 0119898 | 9/1984 | European Pat. Off. . |
| 0214948 | 3/1987 | European Pat. Off. . |
| 998484 | 1/1952 | France . |
| 1039319 | 9/1958 | Germany . |
| 3333938 | 4/1985 | Germany . |
| 9404546 U | 7/1995 | Germany . |

OTHER PUBLICATIONS

Diamond, Power transmission products, Catalog 766, pp. 60–6,60–8,60–10, and 60–24, Jun. 24, 1970.

*Primary Examiner*—David Jones
*Attorney, Agent, or Firm*—W. F. Fasse; W. F. Fasse

[57] ABSTRACT

A tentering chain is assembled of inner links and outer links or link plates interconnected by journal pins passing through the outer link plates and through the inner links so that the latter are positioned between the outer link plates. The inner links have plates which are provided with integral bearing bushings that are interconnected at a junction (J) formed by pressing four bearing bushings together with a transition fit after a bearing roller has been placed on each of two of the four bushings to form the inner links. The inner link plates form with their bearing bushings two chain link sections (1, 2) that are easily interconnected at the junction (J) and also easily disconnected again at the junction. Both sections are made by casting or drop forging.

19 Claims, 6 Drawing Sheets ic chain and to inner or
ENDLESS TENTERING CHAIN AND INNER CHAIN LINK FOR SUCH A TENTERING CHAIN This application is based on and claims the priority under 35 U.S.C. §119 of German Patent Application 197 04 827.7, filed on Feb. 8, 1997. The entire disclosure of German Patent Application 197 04 827.7 is incorporated herein by reference.

FIELD OF THE INVENTION

The invention relates to a tentering chain and to inner or bearing roller carrying chain links of such a chain. Such tentering chains are used, for example in film stretching machines for biaxially stretching thermo-plastic films.

BACKGROUND INFORMATION

Generally, the prior art describes a multitude of chain links for transport chains in tensioning machines such as film stretching machines. These chains are basically sprocket chains and comprise a plurality of chain links, including so-called outer chain links and inner chain links. The outer chain links are merely chain link plates, while each of the inner chain links includes inner chain link plates interconnected by bearing bushings surrounded by a bearing roller. The outer chain link plates and the inner chain links with their bearing bushings are interconnected by journal pins passing through the respective bearing bushings and through the inner and outer chain link plates. Thus, each bushing surrounds its respective journal pin and the bushing in turn is surrounded by its bearing roller that in operation is contacted by the teeth of a drive sprocket, whereby the bolt functions as a journal.

It is known to insert between the journal pin and the bushing on the one hand, and between the bushing and the bearing roller on the other hand, a friction reducing, elastic bearing material having the required abrasion strength and a smooth surface. Reference is made in this connection to U.S. Pat. No. 4,926,529 (Hosmer et al.), issued on May 22, 1990, for a tenter frame apparatus and method in which the tentering chains comprise elastic, abrasion resistant insert sleeves. Similar disclosures are found in European Patent Publication 0,214,948 (Beeuwsaert), published on Mar. 18, 1987 and in German Patent Publication 1,039,319 (Otto), published on Sep. 18, 1958.

It is a disadvantage of the above mentioned prior art that each inner chain link must be assembled of separate inner link plates, separate bearing bushings and abrasion resistant sleeves. The bearing bushings normally interconnect the respective link plates with each other. Moreover, such chain links require a relatively high machining effort in addition to the just mentioned assembly effort for producing the links and journals for a complete endless tentering chain.

German Patent Publication DE 3,333,938 (Gresens), published on Apr. 11, 1985, discloses a tentering chain for tensioning or film stretching machines in which needle bearings are inserted between the journal pin and a sleeve and between the sleeve and an outer bearing roller resulting in a rather expensive construction.

European Patent Publication 0,119,898 (Gaiffe et al.), published on Sep. 26, 1984, discloses a construction of abrasion resistant, flanged insert bushings (e.g. 7a, 7b) for chain links. Gaiffe et al. also disclose in FIG. 2 integral chain link sections with link plates and bearing bushings that are separated from each other, whereby a proper axial alignment of the chain link bearing bushings is not assured.

It is also known to manufacture the components for the inner chain links as so-called precision casting components by investment casting or lost wax casting to produce these components so that they do not require any machining operation following the casting. However, where machining operations are eliminated substantial disadvantages are involved even with precision cast components, because the on-center spacing between the central rotational axes of the bearing bushings in which the journal pins and bearing sleeves are received, may vary from link to link. As a result, an exact meshing of a drive sprocket wheel with the bearing rollers carried on the bearing bushings of the chain links is not assured. As a result, a substantial wear and tear that reduces the useful life of such chains cannot be avoided. The gear teeth of the drive sprocket are also exposed to substantial wear and tear. Another disadvantage is seen in that even with investment casting the formation of shrinkage cavities is unavoidable so that the cast components must be inspected by an X-ray machine which adds to the end costs of the assembled chain. Another disadvantage is seen in that especially in connection with high speed chain operations, conventional chains do not run quietly and become noisier as they age.

OBJECTS OF THE INVENTION

In view of the above it is the aim of the invention to achieve the following objects singly or in combination:

to construct a tentering chain, more specifically the inner chain links for a tentering chain in such a way that the on-center spacings between the chain link journal pins are kept within an acceptable minimal tolerance range;

to construct these inner chain links as roller links without the need for abrasion resistant sleeves;

to produce the components for the inner chain links by precision casting or by drop forging, thereby reducing the need for subsequent machining operations without completely eliminating machining;

to construct the bearing bushings as integral components of the respective inner chain link plate and to form the free ends of the bushings away from the respective link plate as guide elements which facilitates the joining of two link sections to each other;

to use tenter components such as tenter hooks or tenter clamps as outer chain link plates; and to substantially simplify the assembly of the inner chain links while assuring a precision assembly of link sections to each other.

SUMMARY OF THE INVENTION

The inner chain links according to the invention are characterized in that the inner chain link plates and the respective bearing bushings together form integral components as chain link sections that fit together in a junction between two chain link sections. The junction is formed after a bearing roller, referred to simply as roller, has been placed on each of the bearing bushings of one of the chain link sections that together form a link, whereby the bearing roller is held in place around the junction between the two chain link sections. The junction is preferably formed by a socket and collar forming guide elements which facilitate the assembly of the two chain link sections because the collar is firmly guided into the socket.

According to the invention the bearing bushings of the two chain link sections are either symmetrical or non-symmetrical components relative to each other except for the socket and collar. In the symmetric embodiment the bearing bushings all have the same axial length. In the non-symmetric embodiment the bearing bushings have different axial lengths. Due to the production of the chain link sections in a drop forging operation, each of the sections has a homogeneous material texture and an undisturbed and uninterrupted material fiber orientation, whereby higher tension strength characteristics are achieved for the chain links.

Due to the machining of the outer circumference of the bearing bushings it is now possible to place a bearing sleeve of metal onto the respective bearing bushing and a roller onto the bearing sleeve prior to joining the two chain link sections to each other, thereby facilitating the assembly of the chain links. By providing a machining of the bearing bushings on the interior thereof it is possible to place an inner bearing sleeve also into the bearing bushings prior to fitting two sections together and to pass the journal pin through the inner bearing sleeve. In this manner the invention achieves the required precise on-center spacings between the rotational longitudinal axes of the respective journal pins within a permissible tolerance range.

Another advantage of the inner chain links according to the invention is seen in that they may be used in combination with outer chain link plates that are actually roller parts of tentering components, such as tentering hooks and/or tentering clamps. Thus, these roller parts form part of the tentering components and are simultaneously outer chain link plates.

Still another advantage is seen in that the junction is easily formed, for example by a transition fit between the socket and collar provided by a respective machining, such as mechanical machining, of the areas at the bearing bushing ends where either the collar or socket is formed which provide an automatic centering of the two chain link sections relative to each other, thereby further facilitating the assembly of these components and assuring a precise on-center spacing between the rotational axes of a chain link.

BRIEF DESCRIPTION OF THE DRAWINGS

In order that the invention may be clearly understood, it will now be described by way of example, with reference to the accompanying drawings, wherein.

DETAILED DESCRIPTION OF PREFERRED EXAMPLE EMBODIMENTS AND OF THE BEST MODE OF THE INVENTION

Figure 1:
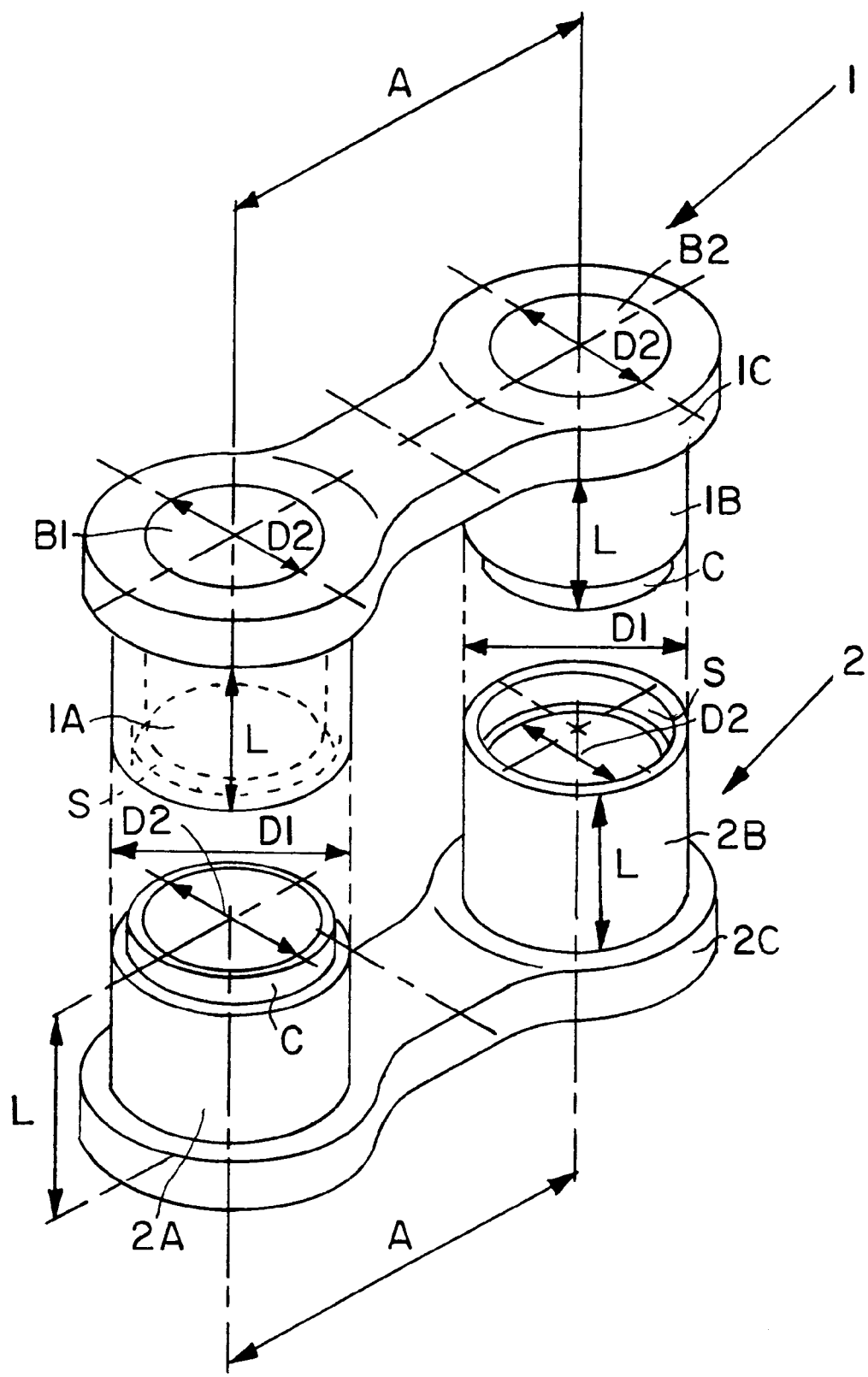
FIG. 1 is a perspective view of two chain link sections according to the invention, wherein the bearing bushings form integral parts of the respective chain link plate and all bushings have the same effective length.

The perspective view of FIG. 1 shows two chain link sections 1 and 2 each including an inner chain link plate 1C and 2C forming an integral component with bearing bushings 1A and 1B and 2A and 2B, respectively. Each of the bearing bushings 1A, 1B, 2A and 2B has an identical axial length L. Thus, both sections 1 and 2 are substantially symmetrical to each other, except for junction forming and guide elements in the form of guide sockets S at the free ends of the bearing bushings 1A and 2B and except for guide collars C at the free ends of bearing bushings 1B and 2A. These guide collars C cooperate with the guide sockets S in forming a junction J, shown in FIG. 5, between the two chain link sections 1 and 2 as will be described in more detail below.

Referring further to FIG. 1, axially extending bores B1 and B2 pass through the chain link plates 1C and 2C and through the bearing bushings 1A, 1B, 2A and 2B. These bores receive a journal pin 6 shown in FIG. 5. The bores B1 and B2 have an on-center spacing A from each other which should be equal in all links forming a chain such as a tentering chain for proper quiet meshing with a drive sprocket not shown. The uniformity of the length of the spacing A throughout an endless chain is also important for reducing wear and tear of the chain and any drive sprocket. FIG. 1 further shows that all bearing bushings 1A, 1B, 2A and 2B have the same outer diameter D1 and the bores B1 and B2 have the same inner diameter D2.

Figure 2:
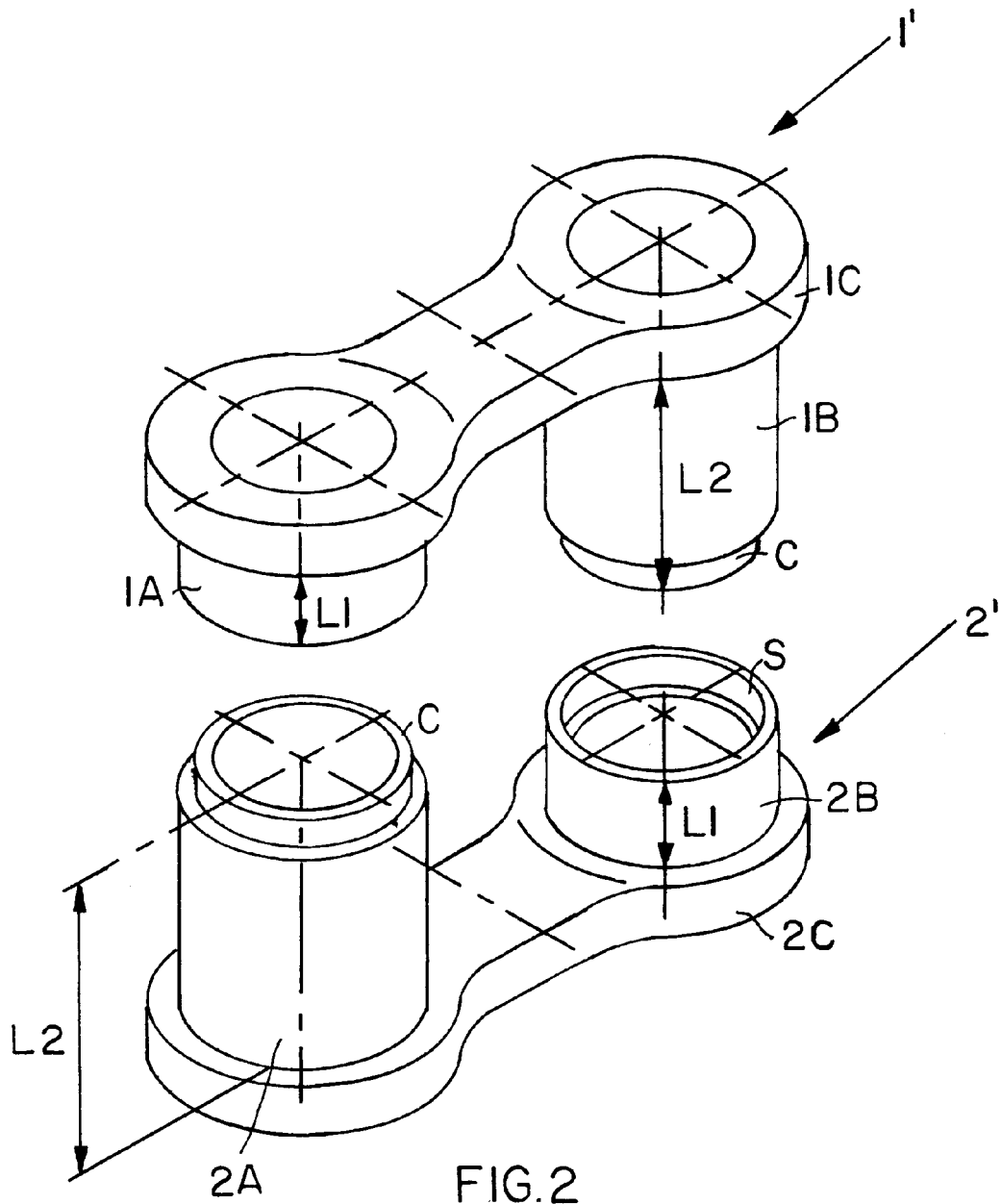
FIG. 2 is a view similar to that of FIG. 1, however the bushings have different effective lengths.

FIG. 2 shows an embodiment of an inner chain link according to the invention in which the bearing bushings have different axial lengths. For example, the bushings 1A and 2B have an axial length L1 while the bushings 1B and 2A have a larger axial length L2. However, the formation of the collars C and the sockets S into which the collars C fit with a transition fit, such as a sliding fit, is the same as in FIG. 1. In both instances the assembly of the two chain link sections 1 and 2 or 1' and 2' is facilitated by the cooperation of the collars C with the sockets S because the collars are properly guided in the sockets.

Figure 3:
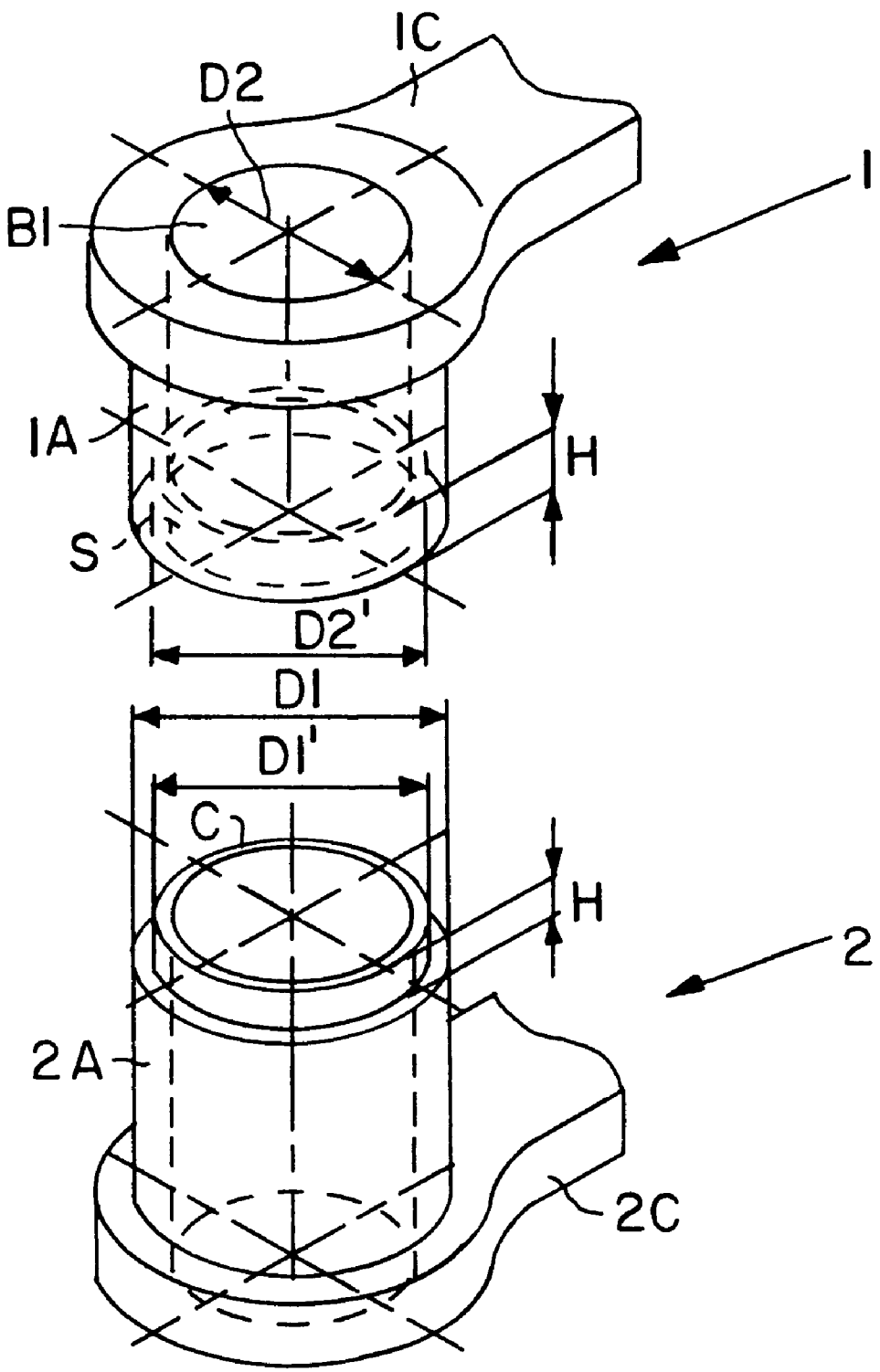
FIG. 3 is a perspective view partly broken away illustrating the diameter relationships of a collar and a socket for forming the junction between two chain link sections.

FIG. 3 shows the chain link sections 1 and 2 of FIG. 1 after machining. The socket S in the free end of the bearing bushing 1A has an axial depth H. The collar C at the free end of the bearing bushing 2A also has an axial length H identical to that of the socket. Additionally, the socket S has an inner diameter D2' while the collar C has an outer diameter D1'. The outer diameter D1 of the bearing sockets 1A and 2A is not machined in this embodiment and therefore the sockets 1A, 2A have the outer diameter D1. The inner diameter D2 of the bore B1 is the same through the link plates 1C and 2C and through the bushings 1A and 2A to receive a journal pin 6 shown in FIG. 6.

The inner diameter D2' of the socket S is defined by a fit quality of the inwardly facing surface of the socket S. That fit quality is, for example, H7 as defined by German Industrial Standards, the respective sheet of DIN 7154 of which is incorporated herein by reference. Similarly, the outer diameter D1' of the collar C has at least a fit quality f8 as defined by German Industrial Standards, the respective sheet of DIN 7154 of which is hereby also incorporated by reference. These fit qualities are such that the outer diameter D1' is assured to provide with the inner diameter D2' the required transition fit to properly guide the collar C into the socket S.

Figure 4:
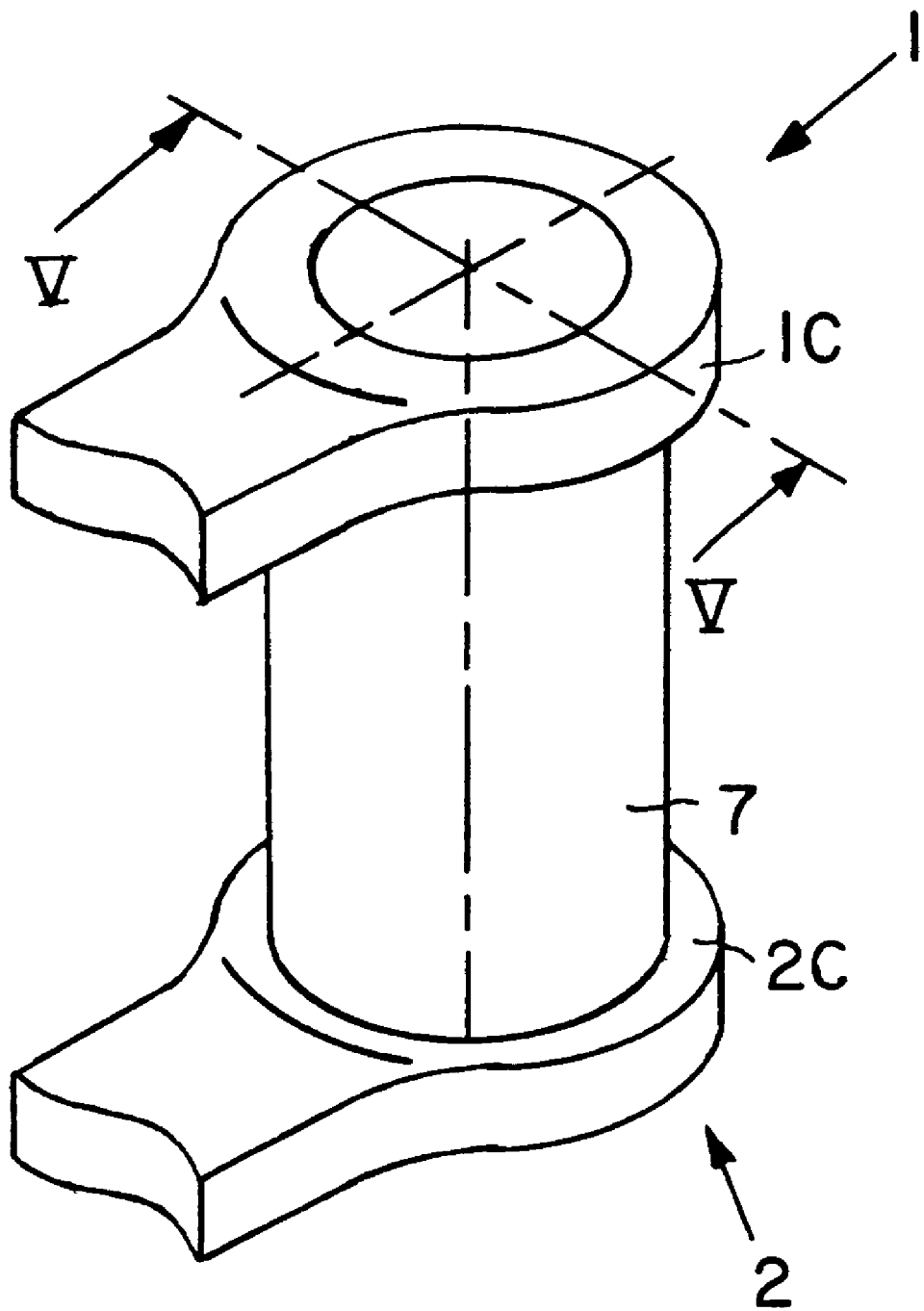
FIG. 4 is a perspective view partly broken away showing two chain link sections after joining and with a bearing roller held on the joint bearing bushings between the two link plates.
Figure 5:
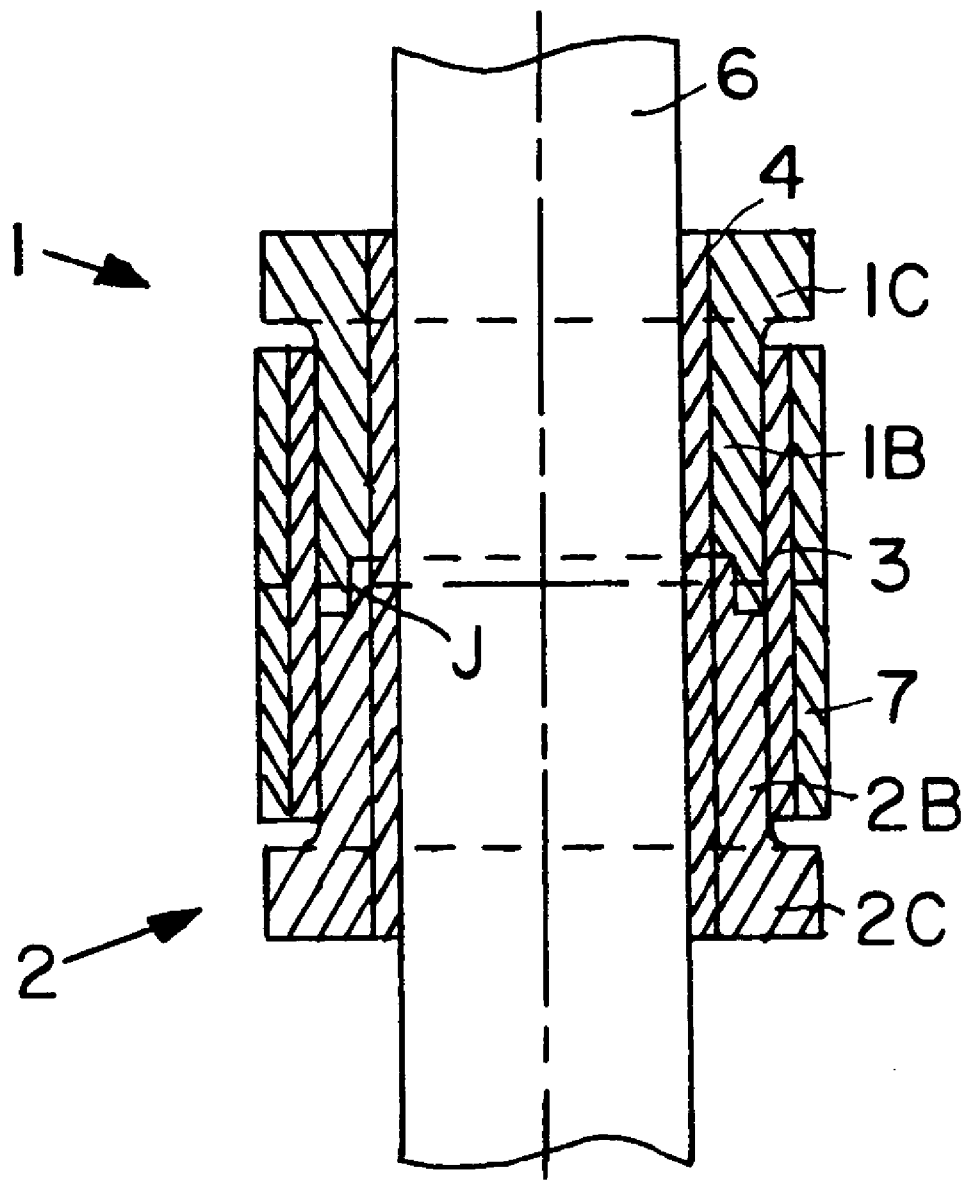
FIG. 5 is a sectional view along section line V—V in FIG. 4 illustrating the use of two slide bearing sleeves of metal.

Referring to FIGS. 4 and 5 in conjunction, FIG. 4 shows the two chain link sections 1 and 2 after forming the junction J, whereby a roller 7 functioning as a bearing roller when it cooperates with a drive sprocket, not shown, is held between the two link plates 1C and 2C. FIG. 5 also shows the journal pin 6 inserted into an inner bearing sleeve 4, which in turn is inserted into the bearing bushings 1B and 2B which in turn are surrounded by an outer bearing sleeve 3, which is surrounded by the roller 7. The outer sleeve 3 and the roller 7 are placed on one of the bearing bushings 1B or 2B and then the junction J is formed. The inner sleeve 4 and the journal pin 6 may be inserted either prior to or after forming the junction J.

Figure 6:
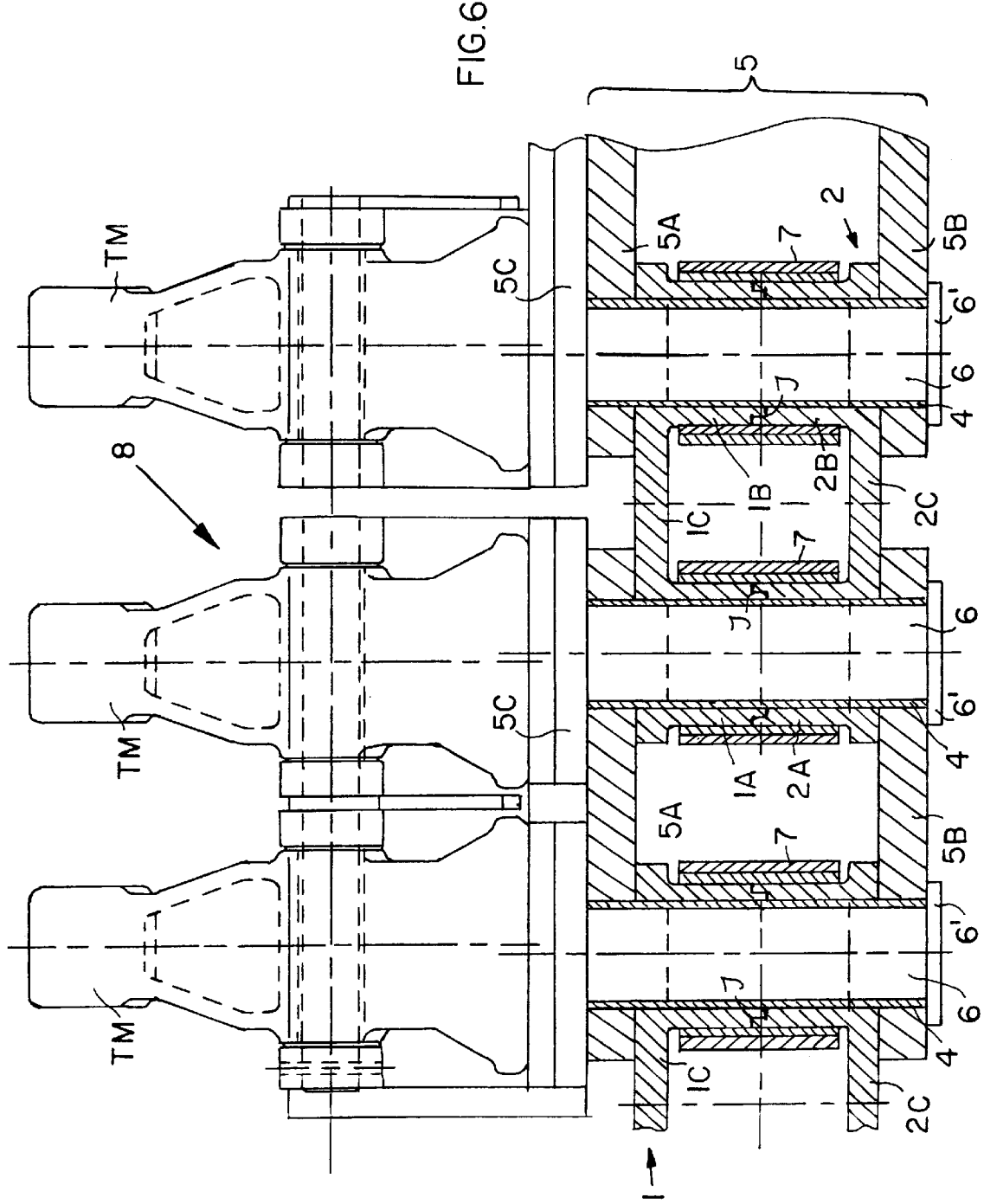
FIG. 6 is a plan view, partly in section, of a portion of a tentering chain equipped with inner chain links according to the invention.

FIG. 6 shows a portion of an endless tentering chain 8 carrying tentering members TM, such as clamps or hooks or the like, to hold a film or fabric to be stretched or dried. The tentering members include a roller section 5 and a base 5C to which the clamps or the like are mounted. The roller section 5 comprises two roller plates 5A and 5B functioning as outer chain link plates through which the journal pins 6 extend. The journal pin 6 is fixed with one end to the base 5C, whereby a flange 6' can hold the outer chain link plates 5A and 5B and the inner chain link sections 1 and 2 with their inner plates 1C, 2C together. Thus, the roller section 5 functions, in addition to carrying the tentering members TM, as outer chain link plates.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A tentering chain comprising first and second outer chain link plates (5A, 5B) for securing tentering members to one of said first and second outer chain link plates, first and second inner chain link plates (1C, 2C), journal pins (6) passing through said first and second outer chain link plates and through said first and second inner chain link plates so that said inner chain link plates are positioned between said outer chain link plates, said first inner chain link plate (1C) comprising two respective first bearing bushings (l1A and 1B) as integral parts of said first inner chain link plate to form a first chain link section (1), said second inner chain link plate (2C) comprising two respective second bearing bushings (2A, 2B) as integral parts of said second inner chain link plate to form a second chain link section (2), one of said first bearing bushings (1A) and one of said second bearing bushings (2A) forming a first pair (1A, 2A) of bearing bushings, the other of said first bearing bushings (1B) and the other of said second bearing bushings (2B) forming a second pair (1B, 2B) of bearing bushings, a junction (J) between said bearing bushings in each of said first and second pairs of bearing bushings, said journal pins (6) passing through said first and second pairs of bearing bushings, and a bearing roller (7) surrounding said junction (J) and each of said first and second pairs of bearing bushings, and wherein one bearing bushing of said first and second pairs of bearing bushings comprises at its free end a socket (S) facing axially away from its chain link plate, wherein the other bearing bushing of said pairs of bearing bushings comprises at its free end a collar (C) facing axially away from its chain link plate, and wherein said collar (C) engages said socket with a transition fit or a press fit to form said junction (J) when said collar (C) is received in said socket.

2. The tentering chain of claim 1, wherein said first bearing bushings and said second bearing bushings have identical dimensions.

3. The tentering chain of claim 1, wherein each of said first and second bearing bushings (1A; 1B; 2A; 2B) has an effective axial length (L) that is the same for all bearing bushings.

4. The tentering chain of claim 1, wherein said first and second bearing bushings forming said pairs of bearing bushings have unequal axial lengths (L1 and L2).

5. The tentering chain of claim 1, wherein said socket (S) has an axial depth (H) and wherein said collar (C) has a corresponding axial length (H) so that a guide is formed by the socket for inserting said collar (C) into said socket (S) to said depth (H).

6. The tentering chain of claim 5, wherein said socket (S) has an inner diameter (D2'), and wherein said collar (C) has an outer diameter for forming said junction (J) with a transition fit or press fit between said collar (C) and said socket (S).

7. The tentering chain of claim 1, wherein said first chain link section (1) and said second chain link section (2) are drop forged components.

8. The tentering chain of claim 1, wherein said first chain link section (1) and said second chain link section (2) are cast components.

9. The tentering chain of claim 1, further comprising tentering members (TM), and wherein said outer chain link plates are part of said tentering members.

10. An inner chain link for a tentering chain, said inner chain link comprising a first chain link plate (1C) and a second chain link plate (2C), said first inner chain link plate (1C) comprising as integral parts two respective first bearing bushings (1A and 1B) forming with said first chain link plate (1C) a first chain link section (1), said second inner chain link plate (2C) comprising as integral parts, two respective second bearing bushings (2A, 2B) forming with said second chain link plate (2C) a second chain link section (2), one of said first bearing bushings (1A) and one of said second bearing bushings (2A) forming a first pair (1A, 2A) of bearing bushings (1A, 2A), the other of said first bearing bushings (1B) and the other of said second bearing bushings (2B) forming a second pair (1B, 2B) of bearing bushings, a junction (J) between said bearing bushings in each of said first and second pairs of bearing bushings, one journal pin (6) passing through each of said first and second pairs of bearing bushings, a bearing roller (7) surrounding said junction (J) and each of said first and second pairs of bearing bushings, and wherein one bearing bushing of said pairs of bearing bushings comprises at its free end a socket (S) facing axially away from its chain link plate, wherein the other bearing bushing of said pairs of bearing bushings comprises at its free end a collar (C) facing axially away from its chain link plate, and wherein said collar (C) engages said socket with a transition fit or press fit to form said junction (J) when said collar (C) is received in said socket (S).

11. The inner chain link of claim 10, wherein said first bearing bushings and said second bearing bushings have identical dimensions.

12. The inner chain link of claim 10, wherein each of said first and second bearing bushings (1A; 1B; 2A; 2B) has an effective axial length (L) that is the same for all bearing bushings.

13. The inner chain link of claim 10, wherein said first and second bearing bushings forming said pairs of bearing bushings have unequal axial lengths (L1 and L2).

14. The inner chain link of claim 10, wherein said socket (S) has an axial depth (H) and wherein said collar (C) has a corresponding axial length (H) so that a guide is formed by the socket for inserting said collar (C) into said socket (S) to said depth (H).

15. The inner chain link of claim 14, wherein said socket (S) has an inner diameter (D2'), and wherein said collar (C) has an outer diameter for forming said junction with a transition fit or press fit between said collar (C) and said socket (S).

16. The inner chain link of claim 10, wherein said first chain link section (1) and said second chain link section (2) are drop forged components.

17. The inner chain link of claim 10, wherein said first chain link section (1) and said second chain link section (2) are cast components.

18. The inner chain link of claim 10, wherein one first bearing bushing (1A) comprises at its free end a socket (S) while the other first bearing bushing (1B) comprises at its free end a collar (C), and wherein one second bearing bushing (2A) comprises at its free end a collar (C) while the other second bearing bushing (2B) comprises at its free end a socket (S).

19. The inner chain link of claim 10, wherein said first bearing bushings (1A, 1B) have sockets (S) at their free ends, and wherein said second bearing bushings (2A, 2B) have collars (C) at their free ends.

\* \* \* \* \*

UNITED STATES PATENT AND TRADEMARK OFFICE
CERTIFICATE OF CORRECTION

PATENT NO. : 5,950,416
DATED : September 14, 1999
INVENTOR(S) : Kerner et al

It is certified that error appears in the above-identified patent and that said Letters Patent is hereby corrected as shown below:

On the title page: ITEM [56] Other Publications:

following line 2, insert --1 sheet DIN 7154 of August 1966--.

Col. 4, line 53, after "sheet", insert --1--;
line 56, after "sheet", insert --1--;

Col. 5, line 36, after "bushings", replace "(11A)" by --(1A)--;

Col. 6, line 11, after "with", replace "a", by --said--;
line 65, after "with", replace "a", by --said--;

Signed and Sealed this

Twenty-ninth Day of February, 2000

Attest:

Q. TODD DICKINSON

Attesting Officer

Commissioner of Patents and Trademarks